United States Patent [19]

Chauvier

[11] 3,871,830

[45] Mar. 18, 1975

[54] POLYMERIZATION REACTOR HAVING A CLOSED UPPER CHAMBER PORTION OF REDUCED DIAMETER AND POLYMERIZATION PROCESS THEREIN

[75] Inventor: Jean-Marie Chauvier, Brussels, Belgium

[73] Assignee: Solvay & Cie, Brussels, Belgium

[22] Filed: July 12, 1973

[21] Appl. No.: 378,403

[30] Foreign Application Priority Data

July 13, 1972 France .............................. 72.25672

[52] U.S. Cl. ............ 23/285, 23/252 R, 260/92.8 W
[51] Int. Cl. ............................. B01j 3/00, C08f 3/30
[58] Field of Search .......... 23/285, 252 R, 290, 283, 23/288 E; 259/108, 107; 260/92.8 R, 92.8 W

[56] References Cited
UNITED STATES PATENTS

| | | | |
|---|---|---|---|
| 2,573,978 | 11/1951 | Malm | 23/285 |
| 2,872,298 | 2/1959 | Loehen | 23/252 R |
| 3,115,333 | 12/1963 | Lennon | 259/107 |
| 3,127,364 | 3/1964 | Legendre | 23/285 |
| 3,131,033 | 4/1964 | Volkenburgh | 23/285 |
| 3,257,171 | 6/1966 | Muench et al. | 23/285 |
| 3,484,204 | 12/1969 | Caviness | 23/285 |
| 3,631,012 | 12/1971 | Zaft et al. | 23/285 |

Primary Examiner—Joseph Scovronek
Assistant Examiner—Dale Lovercheck
Attorney, Agent, or Firm—Spencer & Kaye

[57] ABSTRACT

A polymerization reactor constructed with a cylindrical vessel having a vertical axis and a coaxially disposed chimney at the upper end. A stirrer system is provided in the lower portion of the vessel. The ratio of the chimney inside diameter to the inside diameter of the cylindrical vessel is between 0.20 and about 0.33. The chimney has a volume exceeding 2.5 percent of the actual volume of the reactor.

3 Claims, 1 Drawing Figure

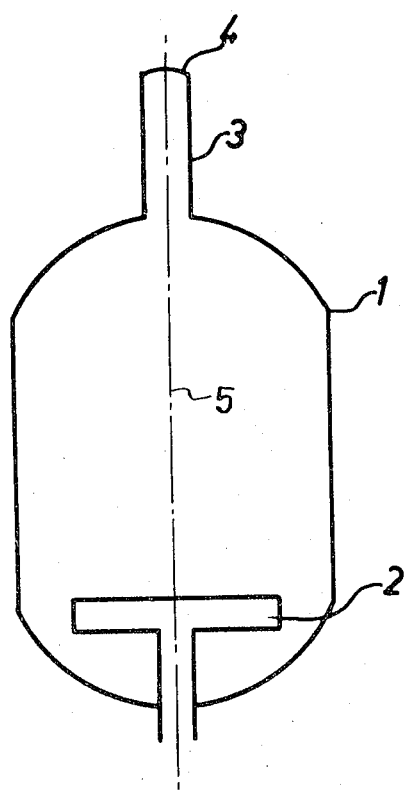

POLYMERIZATION REACTOR HAVING A CLOSED UPPER CHAMBER PORTION OF REDUCED DIAMETER AND POLYMERIZATION PROCESS THEREIN

SUMMARY OF THE INVENTION

The present invention relates to an improvement in reactors used for polymerization in an aqueous medium. More particularly, the object of the invention is to increase production in an apparatus of given volume.

While making it possible to increase the production of the reactors per unit volume this improvement also results in a considerable increase in the purity of the resins due to a reduction in the amount of polymerization ingredients employed.

The invention provides an improved reactor for carrying out polymerization in an aqueous medium. The reactor includes a cylindrical vessel with a vertical axis. At its base the vessel is provided with a stirrer system and in its upper part it has a chimney in the form of a closed upper chamber portion coaxial with the vessel. The inside diameter of the chimney has a ratio to the inside diameter of the cylindrical vessel between 0.2 and about 0.33. The ratio is preferably between 0.25 and 0.3. The chimney volume is greater than 2.5 percent but preferably less than 5 percent of the actual volume of the vessel.

The reactor according to the invention is of considerable technical and economic importance in that it permits the maximum degree of filling of the reactor and enables it to be maintained constant, which considerably improves the productivity of the reactor. It also enables resins of a high degree of purity to be produced due to the reduction in the polymerization ingredients.

The reactor of the present invention enables the degree of filling of the reactor to be increased by a value of the order of 10% compared with that of a classic vertical reactor. With classic vertical reactors there is usually a free space between the reaction medium and the dome of the reactor, as a result of which the reactor can never be completely filled unless special devices are provided. The bursting disc on the dome of the reactor must not be in contact with the reaction medium under any circumstances in order to avoid build-up on the disc and hence the risk that it will not operate if the reaction gets out of control.

Furthermore, the reactor according to the invention enables the degree of filling to be readily maintained constant by the addition of water or an aqueous solution of a reagent in amounts exactly corresponding to the contraction in volume of the reaction medium during polymerization. In particular, as soon as the level of the reaction medium in the chimney falls it can be automatically readjusted by means of an appropriate device. This is a particularly important advantage in polymerization in aqueous emulsion where it is generally very difficult to introduce the reagents in proportion to the contraction in volume that accompanies polymerization.

The apparatus of the present invention can be used for polymerization in an aqueous medium, namely in aqueous emulsion and suspension, and preferably for the homo- and copolymerization of ethylenically unsaturated monomers, more particularly vinyl chloride.

In the present case it has also unexpectedly been found that the resins obtained by means of the apparatus according to the invention exhibit an appreciably lower average particle size than previously. The average particle size of a polyvinyl chloride resin obtained by polymerization in aqueous suspension in a classic vertical reactor is of the order of 140 microns. If the same polymerization recipe, i.e., the same amount of additives, is used but the process is carried out in the apparatus according to the invention the average particle size falls to 30 microns.

This unexpected fact makes it possible to reduce considerably the amount of protective dispersing agent employed by amounts of the order of 50% or more, thereby increasing the purity of the resulting resins. It is well known that the presence of traces of dispersing agent in the resin reduces its purity and particularly that because of the presence of these residues the resins may exhibit an initial color that is unacceptable for certain fields of application such as rigid extrusion.

BRIEF DESCRIPTION OF THE DRAWING

The FIGURE is a diagrammatic sectional view of a reactor according to the present invention.

DESCRIPTION OF THE PREFERRED EMBODIMENTS

The reactor comprises a cylindrical vessel 1 having a vertical axis 5 provided in its lower part with a stirrer system 2 and in its upper part with a chimney 3 coaxial with the vessel and surmounted by a bursting disc 4.

A variant of the invention comprises placing the bursting disc 4 on a lateral pipe on the chimney so that the upper part of the chimney can be used for other purposes, particularly the introduction of the reagents.

The ratio of the inside diameter of the chimney to the inside diameter of the cylindrical vessel should be between 0.20 and about 0.33 and preferably between 0.25 and 0.30. The lower limit of the inside diameter of the chimney is not particularly critical for obtaining the above advantages but is determined by practical considerations such as ease of cleaning the reactor. On the other hand the upper limit of the inside diameter of the chimney is one of the critical features of the apparatus according to the invention.

If, in fact, the ratio between the inside diameter of the chimney and the inside diameter of the vessel exceeds about 0.33 there will be no reduction in the particle size of the resin and hence in the amount of dispersing agent required, as a result of which there will be no improvement in the purity of the resin.

The volume of the chimney should be equal to or greater than 2.5 percent of the actual volume of the reactor, i.e., the volume that can actually be used. A chimney volume of below 2.5 percent is unsuitable for safety reasons, i.e., there is a risk that the bursting disc may come into contact with the reaction medium due to splashing and will therefore not fulfill its function because of build-up. This can only be avoided by reducing the degree of filling of the reactor. The upper limit for the chimney volume is not critical. However, for reasons of economy it is preferable for the chimney volume not to exceed 5 percent of the actual volume of the reactor.

The various devices and regulating means that can be used in the reactor according to the invention, such as pipes and valves for introducing the reagents, discharge valves, means for monitoring the temperature and pressure, etc., are those currently employed in classical reactors for polymerization in an aqueous medium and are well known to persons skilled in the art.

The improvement according to the invention can be applied to reactors of all sizes and particularly to large autoclaves with capacities of up to 140 m³.

EXAMPLES 1 TO 3

The object of these examples is to show the increase in productivity of the reactor according to the invention and the improvement it brings about in the purity of the resins.

The reactor according to the invention, which is illustrated diagrammatically in the attached drawing, comprises a vertical vessel 1 having a diameter of 14 cm and an actual volume of 3.45 l. The upper part of the vessel is provided with a chimney 3 coaxial with the reactor whose diameter is 3.5 cm and volume 172 cm³, which corresponds to a height of 17.8 cm. The lower part of the vessel is provided with a vertical blade stirrer.

Vinyl chloride was polymerized in the above reactor by the classical process for polymerization in aqueous suspension. The operating conditions and the amounts of reagents used are summarized in Table 1.

Comparative Example R₁ concerns the polymerization of vinyl chloride in aqueous suspension under the same operating conditions as those of Examples 2 and 3 except for the polymerization reactor which is a classical vertical reactor, i.e., the one shown diagrammatically in the attached drawing but without the chimney 3 and with the bursting disc 4 placed on the dome of the autoclave.

The particle size distribution of the resulting resins was determined by screening and the average particle size was then obtained. The degree of filling of the reactor was such that no build-up occurred on the bursting disc. The table also gives the amount of polyvinyl chloride obtained together with the amount of build-up on the reactor walls and the bursting disc after polymerization.

Table 1

| Examples | | $R_1$ | 2 | 3 |
|---|---|---|---|---|
| Polymerization Conditions | | | | |
| temperature | , °C | | 60 | |
| stirrer speed | , rpm | | 500 | |
| lauroyl peroxide | , g | | 2 | |
| water | , g | | 1850 | |
| polyvinyl alcohol | , g | 2 | 2 | 0.8 |
| vinyl chloride | , g | 1060 | 1176 | 1176 |
| amount of polyvinyl chloride obtained, g | | 1007 | 1117 | 1117 |
| Properties | | | | |
| Degree of filling of the reactor at 60°C, % | | 90 | 100 | 100 |
| Particle size distribution, microns | | | | |
| >180 microns | | 54 | 2 | 149 |
| 180/128 microns | | 600 | 4 | 419 |
| 128/88 microns | | 294 | 8 | 344 |
| 88/63 microns | | 44 | 24 | 72 |
| 63/42 microns | | 8 | 138 | 16 |
| <42 microns | | — | 824 | — |
| Average particle size, microns | | 137 | 30 | 132 |
| Build-up, % | | 2 | None | None |

The above results show that the reactor according to the invention makes it possible to increase the degree of filling of the reactor by 10 percent (Examples 2, 3 and R₁) and thus to use the reactor to its maximum effective capacity. This means that more monomer can be introduced, and hence the specific productivity of the apparatus is increased.

Furthermore, it is found that the average particle size of the polyvinyl chloride obtained by means of the reactor according to the invention (Example 2) is reduced to 30 microns. Consequently, the amount of dispersing agent employed can be reduced by more than 50 percent while maintaining a constant particle size (Example 3). The reduction in the amount of dispersing agent introduced into the reaction medium results in the production of resins with a high degree of purity. No build-up was observed on the walls of the autoclave or on the bursting disc when the apparatus according to the invention was used (Examples 2 and 3).

As against this, when it was desired to increase the degree of filling of the reactor in Example 1, a considerable amount of build-up was observed on the bursting disc.

EXAMPLE 4

The object of this Example was to show that when a ratio between the chimney inside diameter and the inside diameter of the autoclave exceeding 0.33 is used, no reduction in the particular size is observed. The same conditions as in Example 2 were carried out but with a chimney having an inside diameter of 7 cm and a volume of 172 cm³, which corresponds to a height of 3.4 cm.

It was found that the average particle size obtained in this example was no smaller, but was still of the order of 140 microns. Furthermore, considerable build-up was observed on the bursting disc due to its proximity to the reaction medium.

EXAMPLE 5

This Example shows that a chimney volume below 2.5 percent of the actual volume of the reactor leads to build-up on the bursting disc.

The same conditions as in Example 2 were carried out, but with a chimney having an inside diameter of 3.5 cm and a volume of 69 cm³, which corresponds to a height of 7.2 cm. Considerable build-up was observed on the bursting disc after polymerization. It was also found that build-up on the bursting disc did not occur when polymerization was carried out with a degree of filling of 90 percent or less.

It will be understood that the above description of the present invention is susceptible to various modifications, changes and adaptations, and the same are intended to be comprehended within the meaning and range of equivalents of the appended claims.

I claim:

1. An improved reactor for carrying out polymerization in an aqueous medium, comprising, in combination:

a cylindrical vessel having a vertical axis;
   a stirrer system in the lower portion of said vessel;
   a closed upper chamber portion at the upper portion of said vessel and coaxial with the vessel, said upper chamber portion having an inside diameter whose ratio to the inside diameter of the cylindrical vessel is between 0.20 and about 0.33 and a volume exceeding 2.5% of the actual volume of the reactor; and
   a bursting disc on said upper chamber portion.

2. A reactor as defined in claim 1 wherein the ratio of the upper chamber portion inside diameter to the inside diameter of the cylindrical vessel is between 0.25 and 0.30.

3. A reactor as defined in claim 1 wherein the volume of the upper chamber portion is less than 5 percent of the actual volume of the reactor.

* * * * *